US009470917B2

(12) United States Patent
Lin et al.

(10) Patent No.: US 9,470,917 B2
(45) Date of Patent: Oct. 18, 2016

(54) DISPLAY DEVICE WITH WATERMARK AREA AND NON-WATERMARK AREA

(71) Applicant: SiPix Imaging, Inc., Fremont, CA (US)

(72) Inventors: Craig Lin, San Jose, CA (US); Bryan H. Chan, San Francisco, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 105 days.

(21) Appl. No.: 13/896,232

(22) Filed: May 16, 2013

(65) Prior Publication Data

US 2013/0321744 A1 Dec. 5, 2013

Related U.S. Application Data

(60) Provisional application No. 61/660,372, filed on Jun. 15, 2012, provisional application No. 61/653,210, filed on May 30, 2012.

(51) Int. Cl.
*G02F 1/1333* (2006.01)
*G02F 1/01* (2006.01)
*G02F 1/167* (2006.01)

(52) U.S. Cl.
CPC ........... *G02F 1/1333* (2013.01); *G02F 1/0102* (2013.01); *G02F 1/133377* (2013.01); *G02F 1/167* (2013.01); *G02F 2001/133374* (2013.01); *G02F 2001/1672* (2013.01)

(58) Field of Classification Search
CPC ............. G02F 1/167; G02F 1/133377; G02F 2001/1672; G02F 1/1341
See application file for complete search history.

(56) References Cited

U.S. PATENT DOCUMENTS

| 6,795,138 | B2 | 9/2004 | Liang et al. |
| 6,930,818 | B1 | 8/2005 | Liang et al. |
| 8,237,892 | B1* | 8/2012 | Sprague ............ G02F 1/133504 349/112 |
| 8,553,400 | B2 | 10/2013 | Moran et al. |
| 2007/0053028 | A1 | 3/2007 | Ezra |
| 2010/0103501 | A1* | 4/2010 | Wang ...................... G02F 1/167 359/296 |
| 2012/0019895 | A1* | 1/2012 | Shin ........................ G02F 1/167 359/296 |
| 2013/0247367 | A1* | 9/2013 | Chen ........................ G02F 1/167 29/829 |

FOREIGN PATENT DOCUMENTS

| JP | 2007-309960 | 11/2007 |
| JP | 2009-098469 | 5/2009 |
| KR | 10-2005-0087553 | 8/2005 |
| KR | 10-2010-0042444 | 4/2010 |

(Continued)

OTHER PUBLICATIONS

U.S. Appl. No. 61/653,210, filed May 30, 2012, Lin et al.

(Continued)

*Primary Examiner* — Huyen Ngo
(74) *Attorney, Agent, or Firm* — David J. Cole

(57) ABSTRACT

The present invention is directed to display devices comprising a watermark area and a non-watermark area. The display cells in the watermark area have widths of the partition walls, heights of the partition walls, or top opening shapes, which are different from those of the display cells in the non-watermark area. The watermark aims to protect against counterfeiting or to be used for decoration purposes. The watermark is visible at certain viewing angles and/or under certain lighting conditions and it does not interfere with displaying of the regular images.

19 Claims, 10 Drawing Sheets

(56) References Cited

FOREIGN PATENT DOCUMENTS

| WO | WO 01/67170 | 9/2001 |
|---|---|---|
| WO | WO 2009/153709 A1 | 12/2009 |
| WO | WO 2011/077668 A1 | 6/2011 |

OTHER PUBLICATIONS

U.S. Appl. No. 61/660,372, filed Jun. 15, 2012, Lin et al.
Nikkei Microdevices. (Dec. 2002) Newly-Developed Color Electronic Paper Promises—Unbeatable Production Efficiency. *Nikkei Microdevices*, p. 3. (in Japanese, with English translation).
Liang, R.C., Hou, J., & Zang, H.M. (Dec. 2002) Microcup Electrophoretic Displays by Roll-to-Roll Manufacturing Processes. *IDW*, EP2-2, 1337-1340.
Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.
Liang, R.C., Hou, J., Zang, H.M., & Chung, J. (Feb. 2003). *Passive Matrix Microcup® Electrophoretic Displays*. Paper presented at the IDMC, Taipei, Taiwan.
Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.
Chen, S.M. (May 2003) The New Application and the Dynamics of Companies. *TRI*. 1-10. (in Chinese, English abstract attached).
Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.
Lee, H., & Liang, R.C. (Jun. 2003) SiPix Microcup® Electronic Paper—An Introduction. *Advanced Display*, Issue 37, 4-9 (in Chinese, English abstract attached).
Chen, S.M. (Jul. 2003) The Applications for the Revolutionary Electronic Paper Technology. *OPTO News & Letters*, 102, 37-41. (in Chinese, English abstract attached).
Zang, H.M., & Liang, R.C. (2003) Microcup Electronic Paper by Roll-to-Roll Manufacturing Processes. *The Spectrum*, 16(2), 16-21.
Allen, K. (Oct. 2003). Electrophoretics Fulfilled. *Emerging Displays Review: Emerging Display Technologies, Monthly Report*—Oct. 2003, 9-14.
Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).
Zang, H.M. (Oct. 2003). *Microcup® Electronic Paper by Roll-to-Roll Manufacturing Processes*. Presentation conducted at the Advisory Board Meeting, Bowling Green State University, Ohio, USA.
Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.
Ho, C., & Liang, R.C. (Dec. 2003). *Microcup® Electronic Paper by Roll-to-Roll Manufacturing Processes*. Presentation conducted at FEG, Nei-Li, Taiwan.
Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE—IS&T Electronic Imaging, SPIE* vol. 5289, 102-108.
Zang, H.M. (Feb. 2004). *Microcup Electronic Paper*. Presentation conducted at the Displays & Microelectronics Conference of U.S. Display Consortium, Phoenix, Arizona, USA.
Wang, X., Kiluk, S., Chang, C., & Liang, R.C. (Feb. 2004). Mirocup® Electronic Paper and the Converting Processes. *ASID*, 10.1.2-26, 396-399, Nanjing, China.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Liang, R.C. (Apr. 2004). *Microcup Electronic Paper by Roll-to-Roll Manufacturing Process*. Presentation at the Flexible Displays & Electronics 2004 of Intertech, San Fransisco, California, USA.
Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.
Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).
Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.
Liang, R.C. (Oct. 2004) *Flexible and Roll-able Displays/Electronic Paper—A Technology Overview*. Paper presented at the METS 2004 Conference in Taipie, Taiwan.
Bardsley, J.N. & Pinnel, M.R. (Nov. 2004) Microcup™ Electrophoretic Displays. *USDC Flexible Display Report*, 3.1.2. pp. 3-12-3-16.
Ho, Candice. (Feb. 1, 2005) *Microcupt® Electronic Paper Device and Application*. Presentation conducted at USDC 4th Annual Flexible Display Conference 2005.
Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.
Liang, R.C., (Feb. 2005) *Flexible and Roll-able Displays/Electronic Paper—A Brief Technology Overview*. Flexible Display Forum, 2005, Taiwan.
Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.
Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.
Wang, X., Zang, H.M. and Li, P. (Jun. 2006) Roll-to-Roll Manufacturing Process for Full Color Electrophoretic film. *SID Digest*, 00pp. 1587-1589.
Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Zang, H.M. (Feb. 2007) *Developments in Microcup® Flexible Displays*. Presentation conducted at the 6th Annual Flexible Display and Microelectronics Conference, Phoenix, AZ Feb. 6-8.
Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.
Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging.
PCT/US2013/041439 Notification of Transmittal of the International Search Report,mailed Aug. 27, 2013.
European Patent Office Communication, F-0378EP, Application No. 13797753.4- 1904 / 2856460 PCT/US203041439 European Search Report, Dated on Nov. 25, 2015.

* cited by examiner

DISPLAY DEVICE WITH WATERMARK AREA AND NON-WATERMARK AREA

This application claims priority to U.S. Provisional Application Nos. 61/660,372, filed Jun. 15, 2012; and 61/653,210, filed May 30, 2012; the contents of which are incorporated herein by reference in their entirety.

FIELD OF THE INVENTION

The present invention is directed to a display device wherein the viewing side of the display device has a watermark area and a non-watermark area and the display cells in the watermark area are modulated to be distinguishable from the display cells in the non-watermark area. The display device comprising the watermark feature is useful for protecting against counterfeiting or decoration purposes.

BACKGROUND OF THE INVENTION

U.S. Pat. Nos. 6,930,818 and 6,795,138 disclose image display devices based on the microcup technology. The patents describe the manufacture of microcups as display cells. The microcups are then filled with a display fluid. The top openings of the microcups may have the same size and shape and such microcups spread across the entire display surface.

BRIEF DISCUSSION OF THE DRAWINGS

SUMMARY OF THE PRESENT INVENTION

Figure 1:
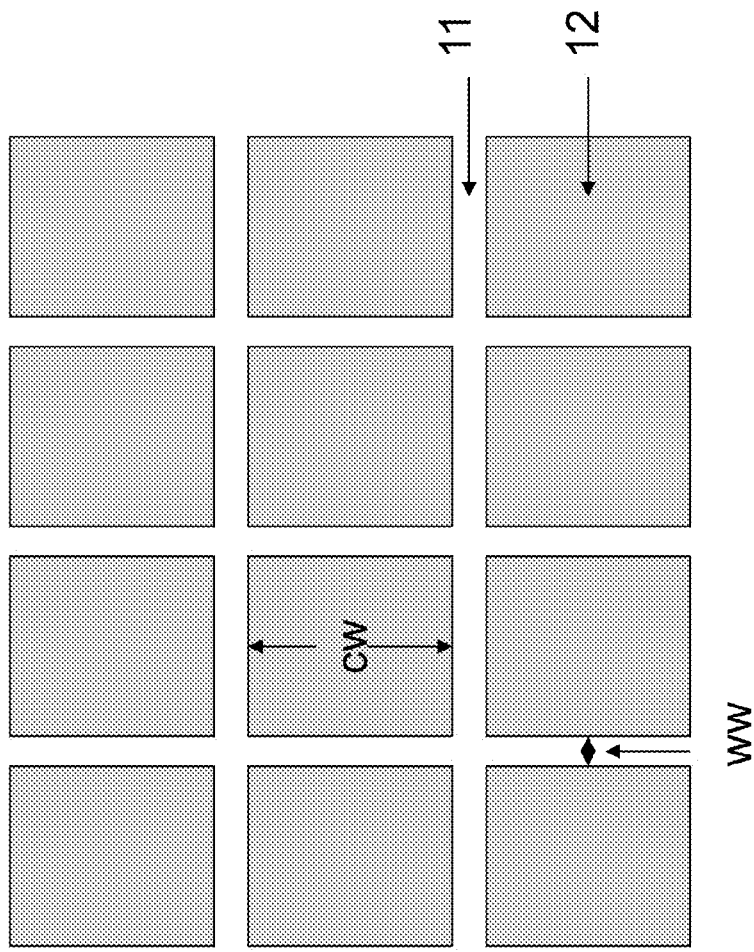
FIGS. 1 and 2 depict top view of display devices.

The first aspect of the present invention is directed to a display device comprising display cells wherein the viewing side of the display device has a watermark area and a non-watermark area and the display cells in the watermark area are modulated to be distinguishable from the display cells in the non-watermark area.

In one embodiment, the walls of the display cells in the watermark area have a different width than the walls of the display cells in the non-watermark area.

In one embodiment, the walls of the display cells in the watermark area are thicker than the walls of the display cells in the non-watermark area.

In one embodiment, the walls of the display cells in the watermark area are thinner than the walls of the display cells in the non-watermark area.

In one embodiment, the walls of the display cells in the watermark area are at least about 5% thicker or thinner than those in the non-watermark area.

In one embodiment, the walls of the display cells in the watermark area have different thickness.

In one embodiment, the wall of at least one side of a display cell in the watermark area has varying thickness.

In one embodiment, the walls of the display cells in the watermark area have a different height than the walls of the display cells in the non-watermark area.

In one embodiment, the display cells in the watermark area have a different shape than the display cells in the non-watermark area.

In one embodiment, the display cells in the watermark area have more than one type of shape.

In one embodiment, the display device is a reflective type of display device.

In one embodiment, the display device is a transmissive type of display device.

In one embodiment, the display device is a transreflective type of display device.

In one embodiment, the display device is an electrophoretic display.

In one embodiment, the display device is a liquid crystal display.

In one embodiment, the display device further comprises a color layer on the non-viewing side of the display device. The color layer may be a sealing layer, an adhesive layer or an electrode layer. The color layer may be of a reflective nature, such as a metallic layer or a scattering reflective nature.

Another aspect of the present invention is directed to a display device comprising display cells separated by partition walls wherein at least one parameter of the display cells in the watermark area is modulated with at least two variations which are different from that parameter in the non-watermark area. In one embodiment, the parameter is the partition wall height. In another embodiment, the parameter is the partition wall width. In a further embodiment, the parameter is the shape of the display cells.

DETAILED DESCRIPTION OF THE INVENTION

The present inventors have now found that a watermark feature may be added to a display device, which watermark is useful to protect against counterfeiting when a security measure is required for the display device. In addition, the watermark may also be used for ornamental design/decoration purposes.

The watermark feature may be achieved by modulating (i.e., altering) at least one parameter of the display cells, in the watermark area.

Figure 2:
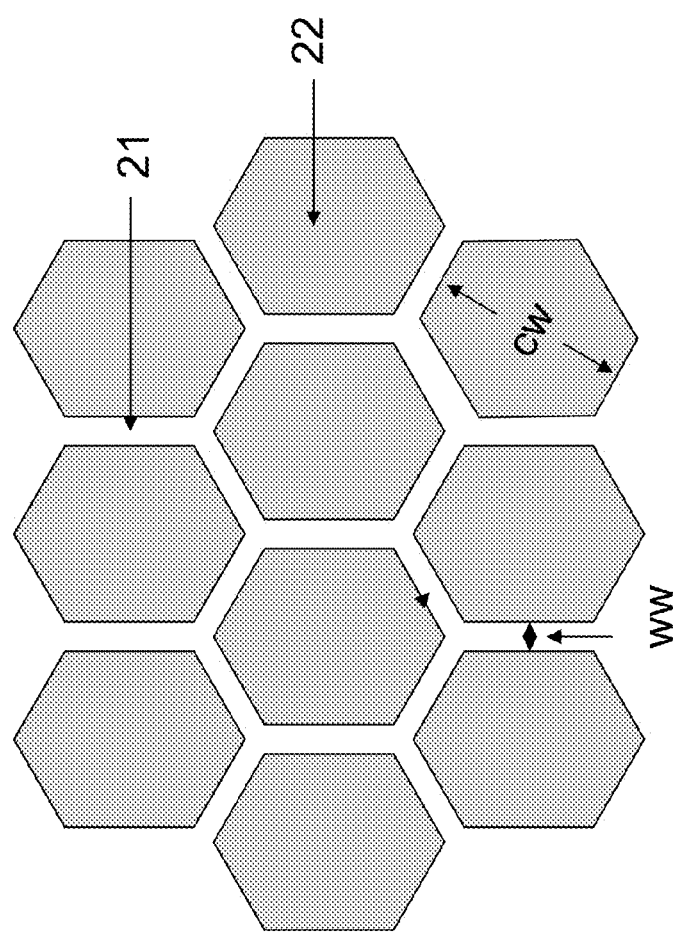

FIGS. 1 and 2 depict top views of a display device. In the two examples, the display cells have a square or hexagonal top opening, respectively. The entire surface of the display device may be divided into the display cell area (shaded) and the partition wall area (11 and 21). The display cell area comprises a plurality of display cells (12 and 22) which are micro-containers filled with a display element, such as a display fluid.

Each individual display cell usually has a cell width (cw) smaller than 300 μm. The cell width, in the context of this application, is defined as the distance between two opposing parallel sides of a display cell.

Because of their small size and uniform shape, the individual display cells are barely perceivable by naked eyes. Therefore such a display device can display images without the grid-like feel.

The wall width (ww) of the partition walls is usually in the range of about 5 to about 30 µm. When referring to partition wall in this application, "width" and "thickness", and "wider" and "thicker" are used interchangeably in this application.

Therefore, display devices prepared by the microcup technology (as described in U.S. Pat. Nos. 6,930,818 and 6,795,138) are most suitable for the present invention because the microcup-based display cells are sufficiently small and they may be formed to have a uniform size and shape. However, the scope of the invention may also extend to any display device as long as it has display cells which are sufficiently small and have well-defined sizes and shapes that may be pre-determined before manufacture. The display cells, e.g., microcups are formed of a transparent material.

The microcup-based display cells may be manufactured by any of the processes (such as microembossing) described in the US patents identified above, both of which are incorporated herein by reference in their entirety. Briefly the modulated parameter(s) may be built-in in the male mold to be used for forming the microcup-based display cells in an embossing process.

The display element filled in the display cells may be an electrophoretic fluid comprising charged pigment particles dispersed in a solvent or solvent mixture. An electrophoretic display typically comprises two plates with electrodes placed opposing each other. When a voltage difference is imposed between the two electrodes, the pigment particles in the display fluid migrate to one side or the other causing either the color of the pigment particles or the color of the solvent being seen from the viewing side.

Alternatively, an electrophoretic fluid may comprise two types of charged pigment particles of contrasting colors and carrying opposite charges, and the two types of the charged pigment particles are dispersed in a clear solvent or solvent mixture. In this case, when a voltage difference is imposed between the two electrode plates, the two types of the charged pigment particles would move to opposite ends (top or bottom) in a display cell. Thus one of the colors of the two types of the charged pigment particles would be seen at the viewing side of the display cell.

While electrophoretic display is specifically mentioned, it is understood that the present application is applicable to other types of display device as well, such as other types of reflective display device or transmissive and transreflective display devices, including liquid crystal display devices.

The watermark created according to the present invention is visible at certain viewing angles and/or under certain lighting conditions. The watermark would not interfere with the desired regular images displayed (based on movement of charged pigment particles in a solvent or solvent mixture in an electrophoretic display, for example).

Figure 3:
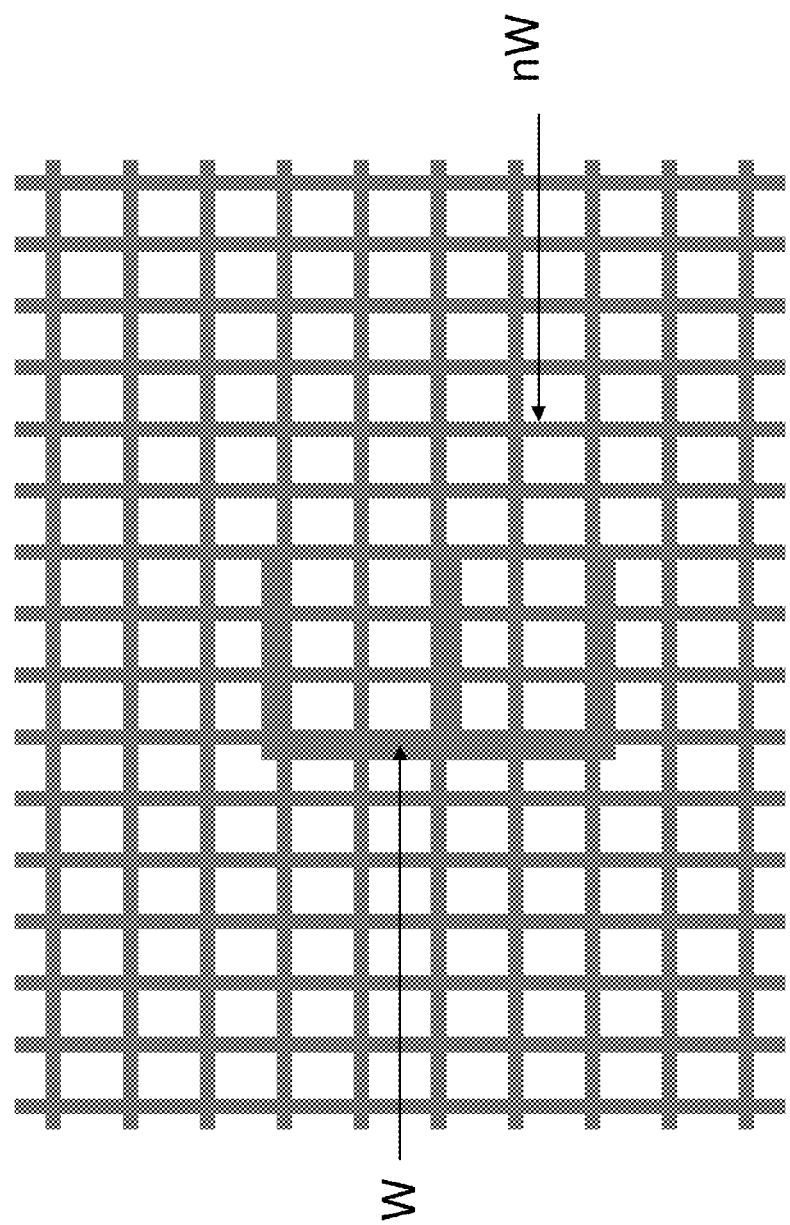
FIG. 3 shows a watermark area in which the walls of the display cells are thicker or wider than those in the non-watermark area.

In one embodiment of the present invention, the width of the partition walls of the display cells is modulated. As shown in FIG. 3, the display device has a watermark area (W) and a non-watermark area (nW). In the watermark area (alphabet "E"), the partition walls of the display cells are wider or thicker than those in the non-watermark area.

In another embodiment, the partition walls in the watermark area may be thinner than those in the non-watermark area.

In general, the width of the partition walls in the watermark area may be at least about 5% thicker or thinner than those in the non-watermark area. It is noted that the wall thickness in some of the drawings is exaggerated for clarity.

Figure 4:
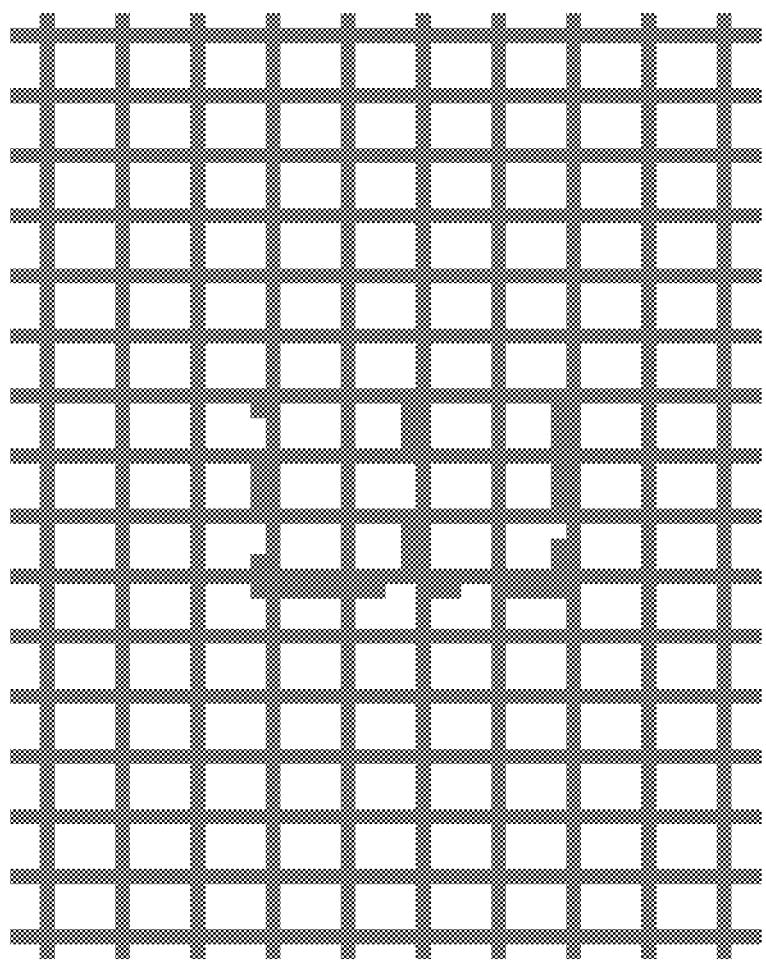
FIG. 4 shows the wall thickness in the watermark area may vary.

In another embodiment as shown in FIG. 4, the thickness of the partition walls in the watermark area may vary. In this case, the differences in the wall width can generate different levels of color intensity to display a grey-scale-like image for the watermark.

Figure 5:
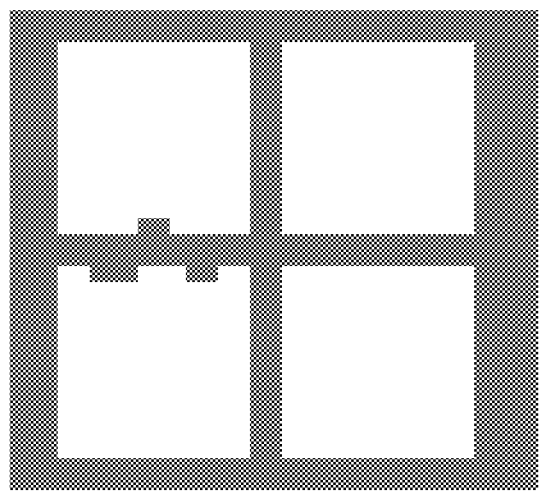
FIG. 5 shows the thickness of the wall on at least one side of a display cell may vary.

In a further embodiment as shown in FIG. 5, the wall thickness may vary within the partition wall on at least one side of a display cell. By varying the wall thickness on at least one side of a display cell, it may create a different optical effect in the watermark area to cause it to be distinguished from the non-watermark area.

Figure 6:
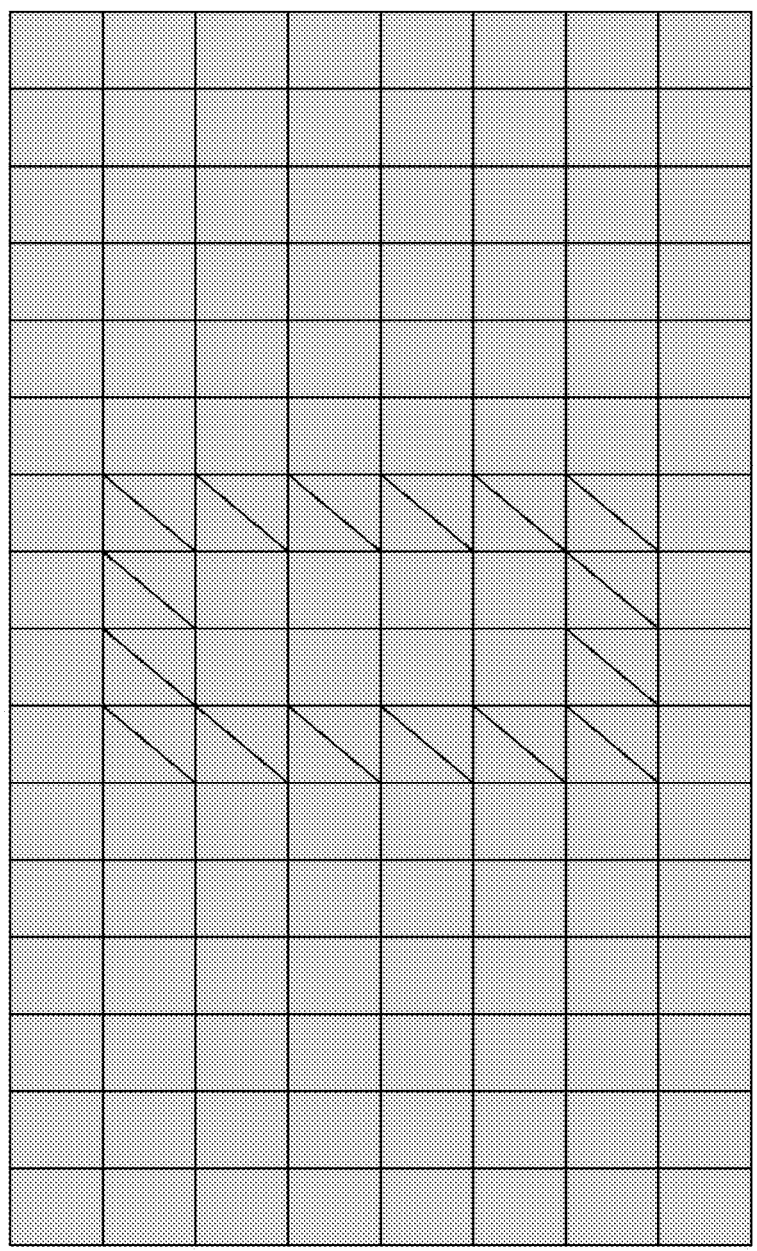
FIG. 6 shows a watermark area in which the shape of the display cells is different from that in the non-watermark area.

In yet a further embodiment, the shape of the display cells may be a modulating parameter. In an example as shown in FIG. 6, the display cells in the watermark area (alphabet "O") have a different shape (i.e., triangle) than those in the non-watermark area (i.e., square). The shapes in the watermark area or the non-watermark area are not limited to triangle or square. They may be any regular shapes or irregular shapes as long as the shape of the display cells in the watermark area is different from that in the non-watermark area. It is also possible that not all of the display cells in the watermark area have the same shape. The term "shape", in this embodiment of the invention, refers to the shape of the top opening of the display cells.

The different shapes of the display cells in the watermark area may be achieved by a number of methods. Certain methods are described in U.S. patent application Ser. No. 13/765,588, the content of which is incorporated herein by reference in its entirety. Briefly, the design of the different shape of the display cells (e.g., microcups) in the watermark area may be achieved by removing partition walls of non-altered display cells and replacing the removed partition walls with new partition walls. Alternatively, the design of the different shape of the display cells (e.g., microcups) in the watermark area may be achieved by independently shifting apex points of non-altered display cells within a defined area, and reconnecting the shifted apex points. Utilizing these design methods, the display cells in the watermark area may have different shapes (i.e., randomized).

In yet a further embodiment, the height of the partition walls of the display cells may be a modulating parameter for the watermark area.

The watermark is not limited to characters, numbers or geometric shapes. It may also be complex images such as pictures with grey levels.

As stated above, the watermark may only be visible in a display device at certain angles or under strong lighting conditions; and it usually will not be seen in the normal display mode so that the quality of the regular images displayed is not affected.

Figure 7:
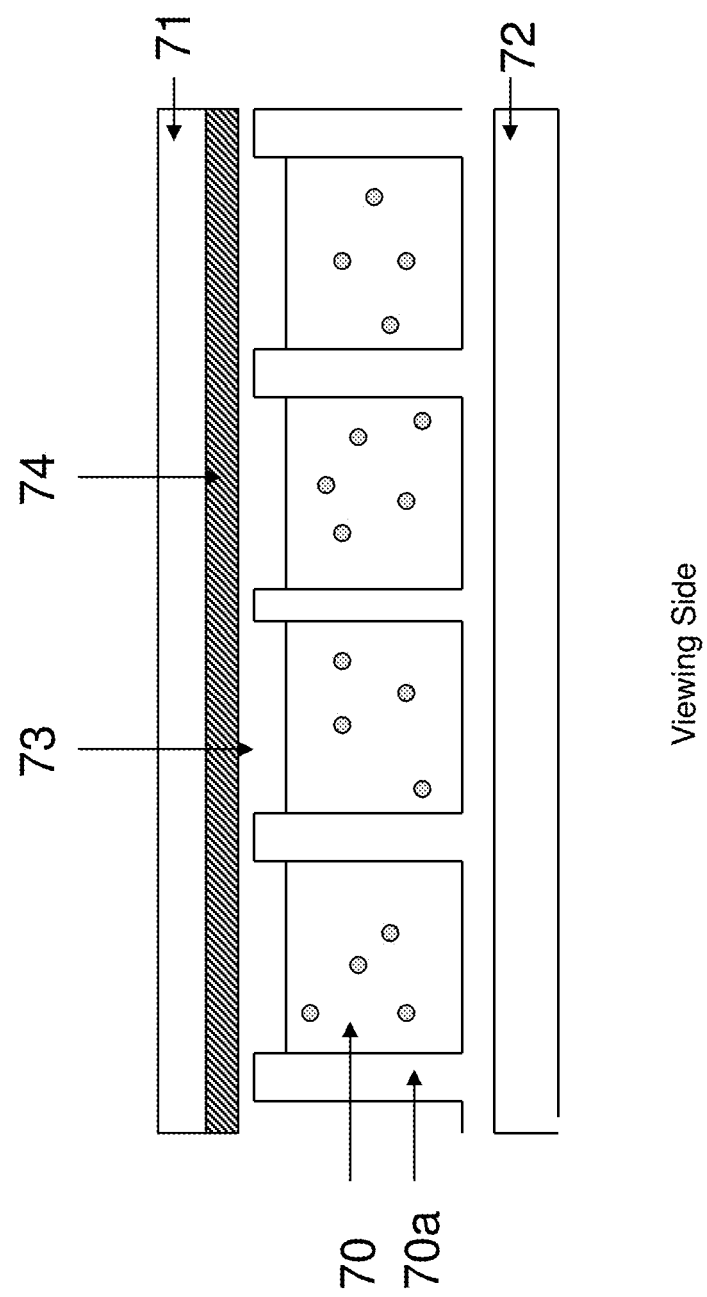
FIG. 7 shows a cross-sectional view of a display panel.

FIG. 7 shows a cross-sectional view of a display panel. A plurality of display cells (70) filled with a display fluid, are sandwiched between two electrode layers (71 and 72). As discussed above, the width of the display cell walls (70a) may be modulated to form a watermark. In the case of microcup-based display cells, the filled microcups are sealed with a sealing layer (73). The electrode layer (71) is laminated over the filled and sealed microcups, optionally with an adhesive layer (74). This display panel is viewed from the side of the electrode layer (72).

In one embodiment of the present invention, a color layer may be added to enhance the viewing of the watermark. The color layer is on the side opposite of the viewing side. In other words, the color layer is on the non-viewing side.

When a color layer is present, the watermark can be better seen even when the image is at the full black or white color state.

The color layer may be achieved by making the sealing layer (73), the adhesive layer (74) or the electrode layer (71) colored. For example, a pigment or dye material may be added to a sealing composition or adhesive composition to cause the sealing or adhesive layer to be colored. The electrode layer may be colored (e.g., a metallic shade).

Figure 9:
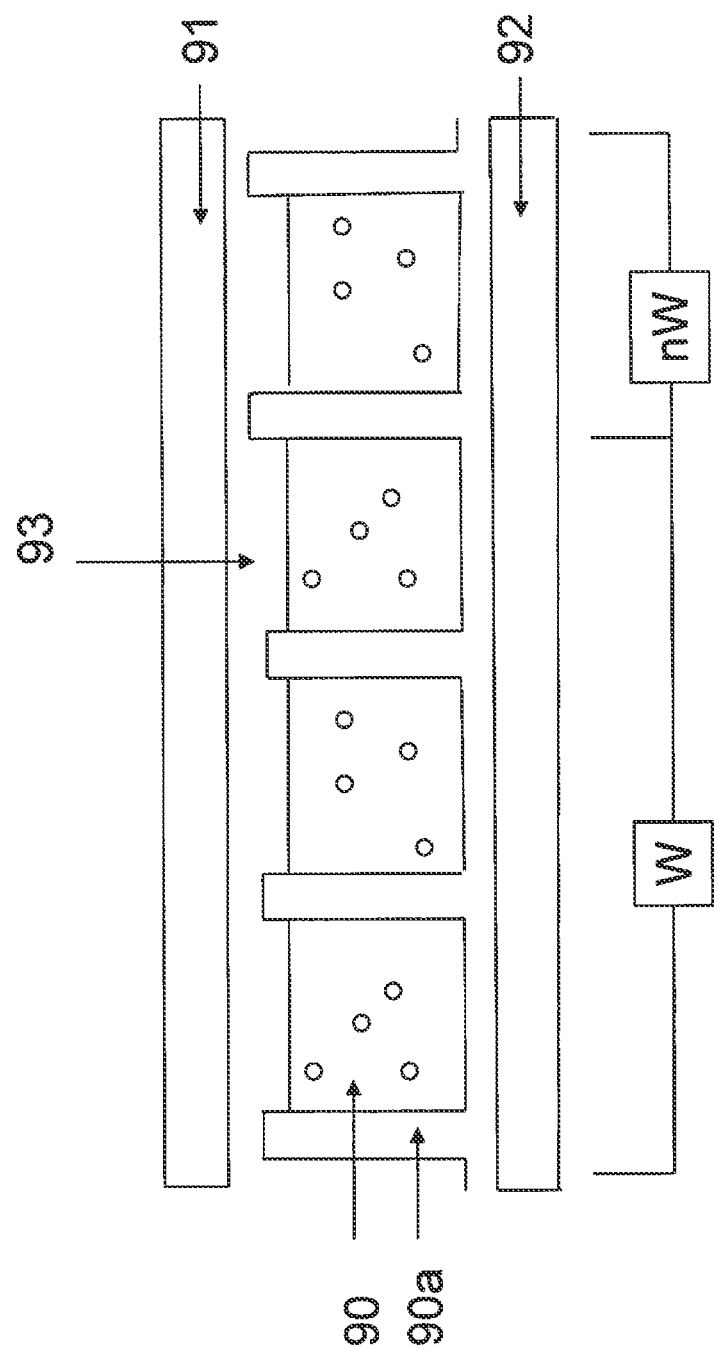
FIG. 9 shows a cross-sectional view of a display panel, which has different heights of partition walls 90*a* in watermark area (W) and non-watermark area (nW).
Figure 10:
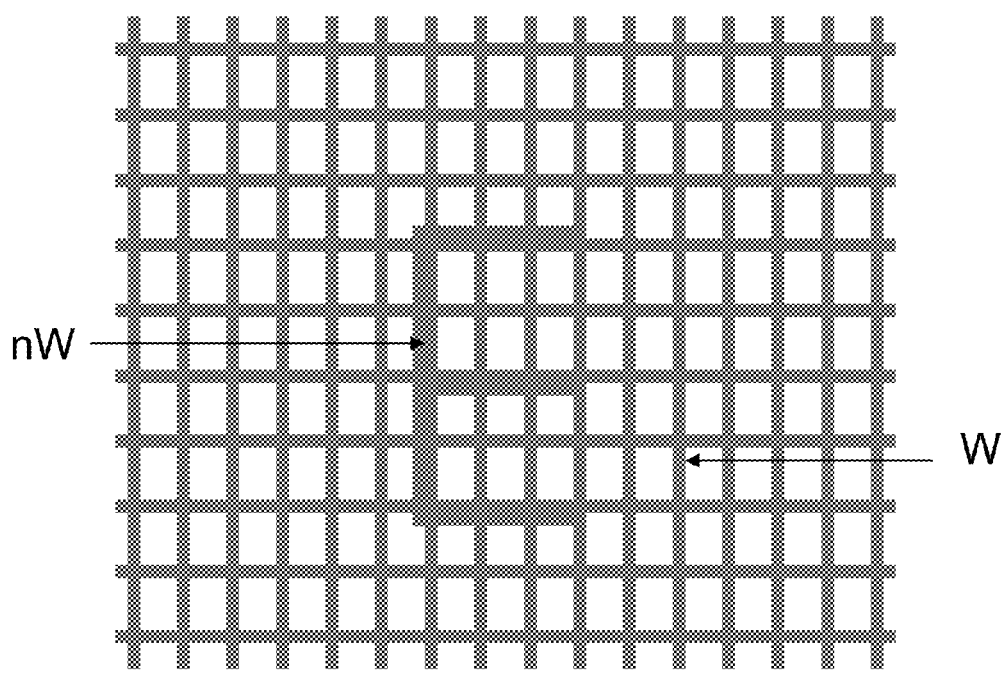
FIG. 10 shows a watermark area in which the walls of the display cells are thinner than those in the non-watermark area.

FIG. 9 shows a cross-sectional view of a display panel. A plurality of display cells (90) filled with a display fluid, are sandwiched between two electrode layers (91 and 92). The filled display cells are sealed with a sealing layer (93). In one embodiment, the sealing layer is a color layer. The heights of partition walls (90*a*) in a watermark area (W) are different from those in a non-watermark area (nW).

In another aspect, each modulating parameter, according to the present invention, may have one or more variations in the watermark area from the non-watermark area. For example, the wall widths of the display cells may be modulated and the display cells in the watermark area may have one or more wall widths which are different from that in the non-watermark area. In another example, the wall heights of the display cells may be modulated and the display cells in the watermark area may have one or more wall heights which are different from that in the non-watermark area. In another example, the shapes of the display cells may be modulated and in this case, the display cells in the watermark area may have one or more shapes which are different from that in the non-watermark area.

Figure 8:
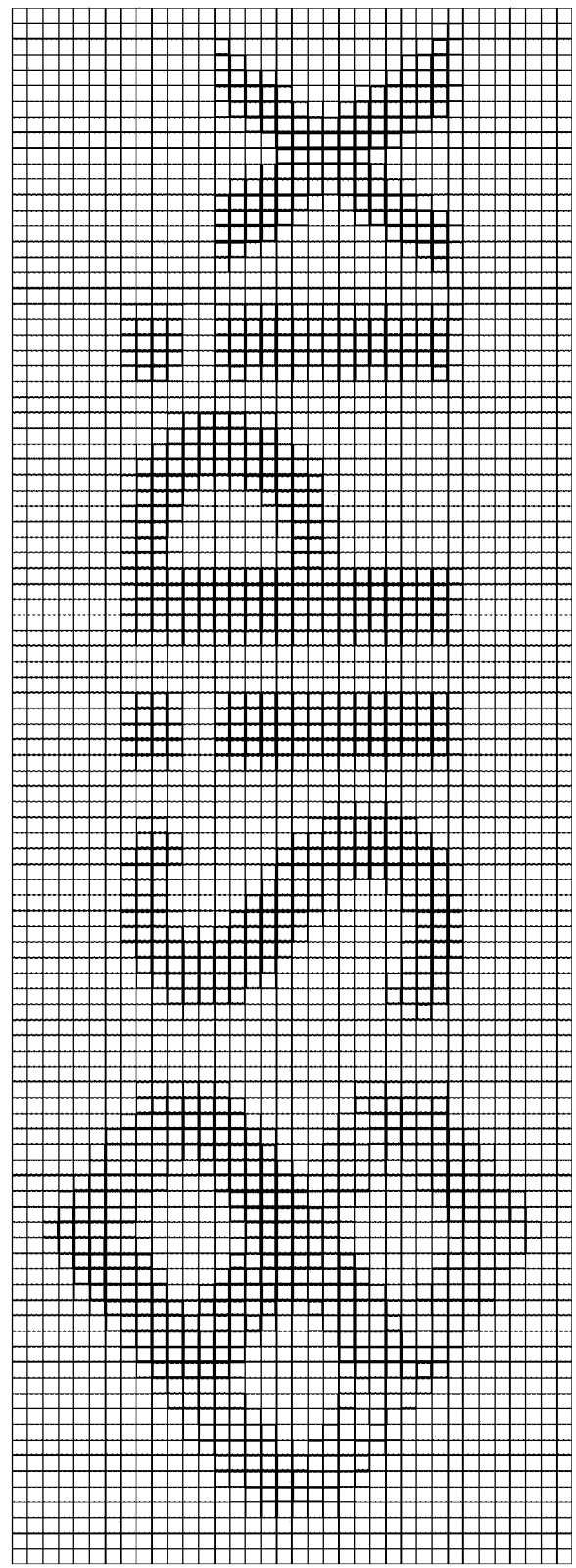
FIG. 8 shows a watermark having different color intensities.

When there are two or more variations for a modulating parameter in the watermark area, the watermark may show different color intensities. As shown in FIG. 8, there are different color intensities in the watermark area (i.e., a logo and the word "SiPix") because there are more than one wall widths which are different from that in the non-watermark area.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A display device comprising display cells filled with a display fluid and each of the display cells has partition walls for separating the display cells, wherein the display device has a watermark area and a non-watermark area, and the display cells in the watermark area have thickness of the partition walls, heights of the partition walls, or top opening shapes, which are different from those of the display cells in the non-watermark area.

2. The display device of claim 1, wherein the display cells in the watermark area have the thickness of the partition walls different from those of the display cells in the non-watermark area.

3. The display device of claim 2, wherein the partition walls of the display cells in the watermark area are thicker than the partition walls of the display cells in the non-watermark area.

4. The display device of claim 2, wherein the partition walls of the display cells in the watermark area are thinner than the partition walls of the display cells in the non-watermark area.

5. The display device of claim 2, wherein the partition walls of the display cells in the watermark area are at least about 5% thicker or thinner than those in the non-watermark area.

6. The display device of claim 2, wherein the partition walls of the display cells in the watermark area have different thickness.

7. The display device of claim 2, wherein at least one partition wall of the display cell in the watermark area has varying thickness.

8. The display device of claim 1, wherein the display cells in the watermark area have the heights of the partition walls different from those of the display cells in the non-watermark area.

9. The display device of claim 1, wherein the display cells in the watermark area have the top opening shapes different from those of the display cells in the non-watermark area.

10. The display device of claim 9, wherein the display cells in the watermark area have more than one type of shape.

11. The display device of claim 1, which is a reflective type of display device.

12. The display device of claim 1, which is a transmissive type of display device.

13. The display device of claim 1, which is a transreflective type of display device.

14. The display device of claim 1, which is an electrophoretic display.

15. The display device of claim 1, which is a liquid crystal display.

16. The display device of claim 1, further comprising a color layer on a non-viewing side of the display device.

17. The display device of claim 16, wherein the color layer is a sealing layer.

18. The display device of claim 16, wherein the color layer is an adhesive layer.

19. The display device of claim 16, wherein the color layer is an electrode layer.

\* \* \* \* \*